United States Patent
Carr et al.

[15] 3,663,805
[45] May 16, 1972

[54] METHOD AND APPARATUS FOR MONITORING PROCESSES

[72] Inventors: Norman L. Carr, Allison Park; Donald L. Stahlfeld, Glenshaw, both of Pa.

[73] Assignee: Gulf Research & Development Company, Pittsburgh, Pa.

[22] Filed: Sept. 1, 1967

[21] Appl. No.: 664,976

[52] U.S. Cl. .......................235/151.12, 235/150.1, 208/107
[51] Int. Cl. .................................G05b 17/00, C10g 13/00
[58] Field of Search ..........208/107, 112; 235/150.1, 151.35, 235/151.12

[56] References Cited

UNITED STATES PATENTS

| | | | |
|---|---|---|---|
| 3,410,793 | 11/1968 | Stranahan et al. | 208/159 |
| 3,497,449 | 2/1970 | Urban | 235/151.12 X |
| 3,000,812 | 9/1961 | Boyd | 208/138 |
| 3,175,968 | 3/1965 | Berger | 235/150.1 X |
| 3,308,040 | 3/1967 | Johnson et al. | 235/150.1 X |
| 3,433,057 | 3/1969 | Halsey | 235/151.35 X |

OTHER PUBLICATIONS

" Developing Predictive Mathematical Models For Hydrocarbon Separations," Horn et al., Chemical Engineering Vol. 71 Sept. 28, 1964 pages 117–122.

Computer Control of Industrial Processes, Savas Mc-Graw-Hill, 1965.

Consider Uses for Analog Computers by John F. Pink, Petroleum Refiner March 1959 pages 215 to 220 Vol. 38 No. 3.

*Primary Examiner*—Eugene G. Botz
*Attorney*—Meyer Neishloss, Deane E. Keith and William Kovensky

[57] ABSTRACT

A method of and apparatus for monitoring a complex chemical process comprising the use of a detailed model and intermediate steps to generate a simplified monitoring model for use with the process which will anticipate process responses.

20 Claims, 9 Drawing Figures

INVENTORS
NORMAN L. CARR
DONALD L. STAHLFELD

INVENTORS
NORMAN L. CARR
DONALD L. STAHLFELD

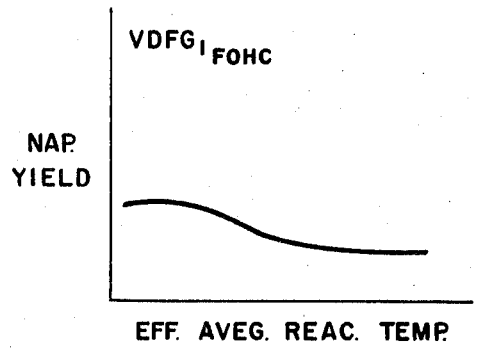
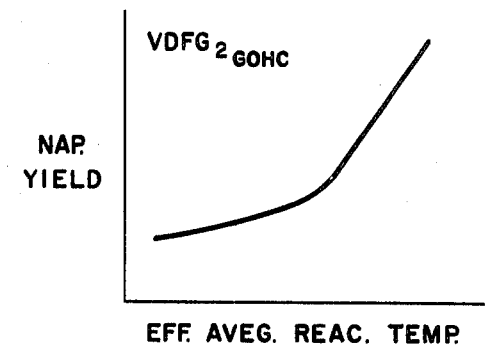
FIG. 5　　　　　FIG. 6
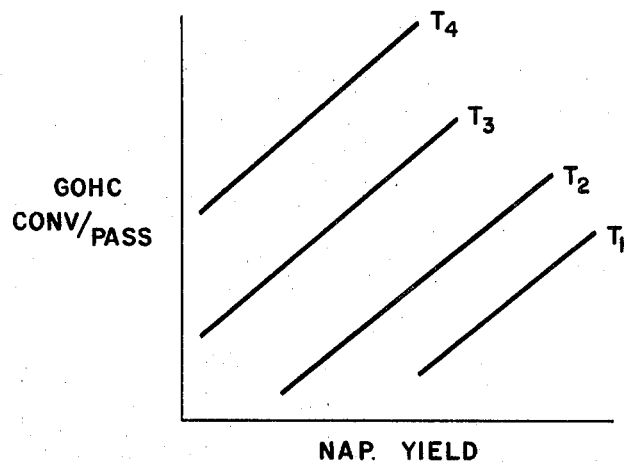
FIG. 7
INVENTORS
NORMAN L. CARR
DONALD L. STAHLFELD

INVENTORS
NORMAN L. CARR
DONALD L. STAHLFELD

METHOD AND APPARATUS FOR MONITORING PROCESSES

This invention relates, in its broader aspects, to a method of monitoring a complex process with the use of several modern techniques, including computers. In its more specific aspects, the invention is directed to an apparatus for monitoring a particular process using the broad technique of the invention, and an array of electronic components comprising a special purpose analog computer.

The invention is particularly adapted for use in the petroleum refining industry, wherein it is desired to monitor a particular output variable of a continuous chemical process. For example, in hydrocracking of various hydrocarbon feed stocks to produce products having lower boiling point temperatures, it has been heretofore conventional to measure flow rates downstream from the hydrocracker, or to perform chemical analysis on the effluent stream in order to determine the desired output variable, which in the case of a hydrocracker is usually conversion per pass. These two methods are not completely satisfactory because they entail a considerable time delay and because, in the case of measuring flow rates only, the result is only approximate. On-stream analyzers are a measurement of results only, and require relatively long periods of time to perform in and of themselves. The errors resulting from these disadvantages, time delay and approximate results, become amplified when the hydrocracker experiences a feed rate or other input variable change. These prior methods are not sufficiently sensitive to such changes in showing changes in conversion because they are essentially direct measurements of results, and hence cannot anticipate what effect such changes within the process will have on results until the results actually occur. Generally, any monitoring system that depends solely or primarily upon measurements of results will suffer from this disadvantage.

The present invention provides methods and apparatus which will, in effect, predict changes in the desired output variable in response to changes in certain selected input variables in accordance with a previously established set of relationships, which are embodied in the monitoring apparatus of the invention, to thereby inform the operator what value the output variable, conversion per pass in the case of a hydrocracker, is right now or will be very shortly, rather than what it was some time ago. This information is required by the operator in order to enable him to adjust various conditions within the process to maximize its efficiency. For example, in the case of a hydrocracker, it is known that for a particular set of conditions, including the characteristics of the particular unit, the feed stock, the catalyst and its activity condition, the desired quantities of end products required for overall refinery operation, and other various factors well known to those skilled in this art, there is some value of conversion per pass which is optimum. It is highly desirable to operate as close to this optimum as is possible in order to avoid adverse effects on any one, some, or all the other related conditions which are tied into the operation of the unit in question.

Thus, it is one object of the present invention to provide a method and apparatus for monitoring a process whereby an operator will always have a present knowledge of the value of a selected output variable in order to enable him to take the necessary steps to maximize process operation.

More specifically, the present invention provides methods and apparatus for monitoring continuous chemical processes of certain types wherein no extraordinary process information other than that information which would normally be required is utilized in order to give a quantitative present value of a selected output variable. For example, in the case of the furnace oil hydrocracker described in the detailed description below, only inlet and outlet temperature, quench flow, and total feed are measured to give conversion per pass. The values of these quantities are required in any case by the refinery for its normal operation.

The apparatus of the invention comprises a special purpose analog computer. An analog computer is used in preference to a digital computer because it is physically smaller and lighter, has a lower initial cost, provides a continuous output in an easily used form such as a curve or a C-R tube display, and because of its great flexibility. The flexibility factor in conjunction with the other advantages of analog computers generically is an important advantage for the present invention, because, for example, by simply changing the settings on the computer, wide ranges of changes within the process being monitored can be accommodated. In a similar situation, a special purpose digital computer would require extensive re-programming or perhaps even re-building, both of which are expensive, time-consuming operations. Further, such setting changes can be made by relatively unskilled persons, whereas a similar change for a digital computer requires the services of at least a computer programmer.

Other advantages of the invention will be pointed out or will become evident in the following detailed description and claims, and in the accompanying drawing also forming a part of the disclosure, in which:

FIG. 5 is response curve for naphtha yield against average reactor temperature for the furnace oil hydrocracker;

FIG. 6 is a response curve similar to the curve of FIG. 5 for the gas oil hydrocracker;

FIG. 7 is a family of curves showing the relationship of conversion per pass to naphtha yield for the gas oil hydrocracker.

Figure 1:
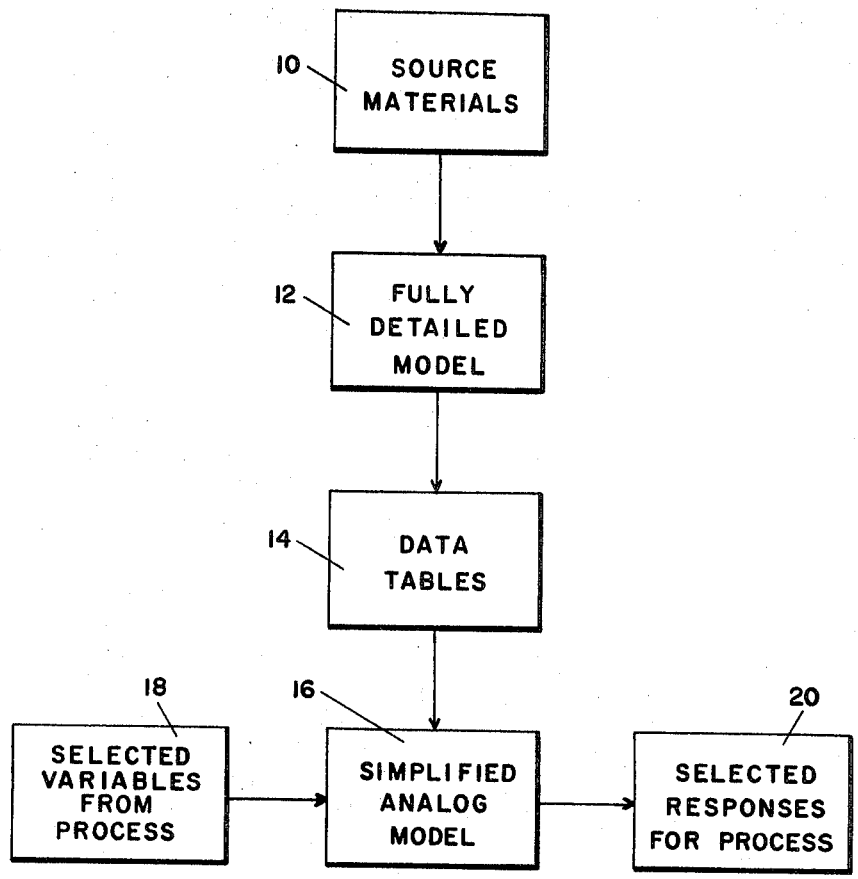
FIG. 1 is a block diagram showing the method of the invention.

Referring now in detail to the drawing, FIG. 1 shows the method of the invention in simplified form as it would be applied to any process adapted for use with the invention.

For reasons which will appear below, the invention is applicable to only processes having certain characteristics. The process must take place in a chemical reactor; a vessel of any sort in which a chemical change occurs involving a thermal or catalytic reaction. The process must be significantly exothermic or endothermic to produce a temperature gradient in the reactor. There must be at least one quantitatively, as opposed to qualitatively, measurable response variable. Finally, there must be no unknown substantial heat loss from the vessel to atmosphere, i.e., substantially adiabatic operation in the reaction section or sections. The process should be continuous, since the invention would have little applicability or advantage if applied to a batch type process. A thermal response is required because by measuring the heat, the energetics of the process can be determined as changes occur. Thus, the method of the invention cannot be used with, for example, an isothermal process, or a process in which the heat given off is wasted or not measured.

Examples of other types of reactions with which the invention may be used in addition to hydrocracking described in detail below include aromatic distillate hydrogenation (ADH) hydrodesulfurization (HDS), thermohydrodealkylation (THD), benzene hydrogenation, catalytic reforming, and thermal reforming.

Referring to FIG. 1, block 10 marked "Source Materials" represents the beginning point of the practice of the method of the invention. Block 10 represents data taken from wherever available concerning the process, and useful in determining the behavior of the process. In the case of the hydrocracking process being described, these source materials include kinetics, reaction heat data, thermal-chemical data, pilot plant studies, energy balances, material balances, vapor-liquid equilibrium data, and physical data on the plant reactor and process. Thus, the term "theoretical source material information" shall be understood in this specification and claims to include information such as is enumerated immediately above, and generally shall be understood to mean information obtained from sources which exclude direct process-related information such as all on-stream measurements or other information garnered from a particular process while it is in operation. Utilizing all of the above information and data concerning the process it is desired to monitor, a "Fully Detailed Model," block 12, is generated. It is significant that model 12 is highly generalized and must be supplied with additional conditions to model some particular process. After said conditions are supplied, this model 12 is not a practical tool for a refinery because of the high cost of the equipment required to implement it. Model 12 is a set of complex mathematical equations which may be programmed into a relatively large multi-purpose analog or digital computer, in order that it may be used further in the method of the invention. Block 14, marked "Data Tables," are obtained from model 12. It will be understood that "Data Tables" 14 represent lists of figures, or graphical representations of this information in the form of curves, or any other form of information as put out by the means used to implement model 12. By utilization of the complete and highly detailed information about the process contained in model 12, a set of data tables or performance curves can be generated by the use of a digital computer, or by hand, or in any other suitable manner, relating a small number of selected input variables to a selected one or two output variables. It is an advantage that the input variables which are selected are physical variables, as opposed to analytically derived variables, and are those that are normally monitored in refinery operations, and which are critical to operation of the particular process, thereby eliminating the need for any additional special equipment, on-stream analyzers for example, when the apparatus of the invention is applied to an actual process in a refinery. The output variable or variables will be the selected critical response variable, in the case of hydrocracking, conversion per pass. In generating data tables or curves 14, the ranges through which all variables of the process are varied are chosen so that they are substantially equivalent to the corresponding ranges that it is anticipated the process will undergo during normal operation. Thus, the information in detailed model 12 is modified by its passage through the step of "Data Tables" 14 in two significant ways. Firstly, all process changes are tied into only changes in the selected input and output variables. The selected input and output variables are critical to operation of the process, so that any significant changes in the process will be reflected in at least one, but usually more than one, of said selected variables. Since model 12 will behave substantially identically to the actual process, the information generated, "Data Tables" 14, will reflect complete process responses. The second significant modification concerns the limitation of the data to only reasonable ranges of process parameter variation, to thereby permit the fabrication of the apparatus of the invention embodied in the "Simplified Analog Model" represented by block 16.

From the Data Tables or curves 14 obtained from detailed model 12 as described above, a second set of equations comprising a second model 16 is generated. Model 16 contains substantially all of the information contained in the highly complex model 12, being limited and modified for the special purpose, as described above. Model 16, in the form of a special purpose analog computer, is then built, and may be shipped as a unit to a refinery to monitor a process corresponding to the process from which Source Materials 10 were taken. The physical installation of model 16 in the refinery is a relatively simple task, in that the various temperature, flow, and the like transducers are already present in one form or another in the refinery and only scaling or compatibility changes are required to make computer 16 operative to monitor the process.

The final two blocks 18 and 20 on FIG. 1, marked "Selected Variables from Process" and "Selected Responses from Process," respectively, represent the use of model 16 to read out the present values of the selected response, conversion per pass, in the example described.

Figure 2:
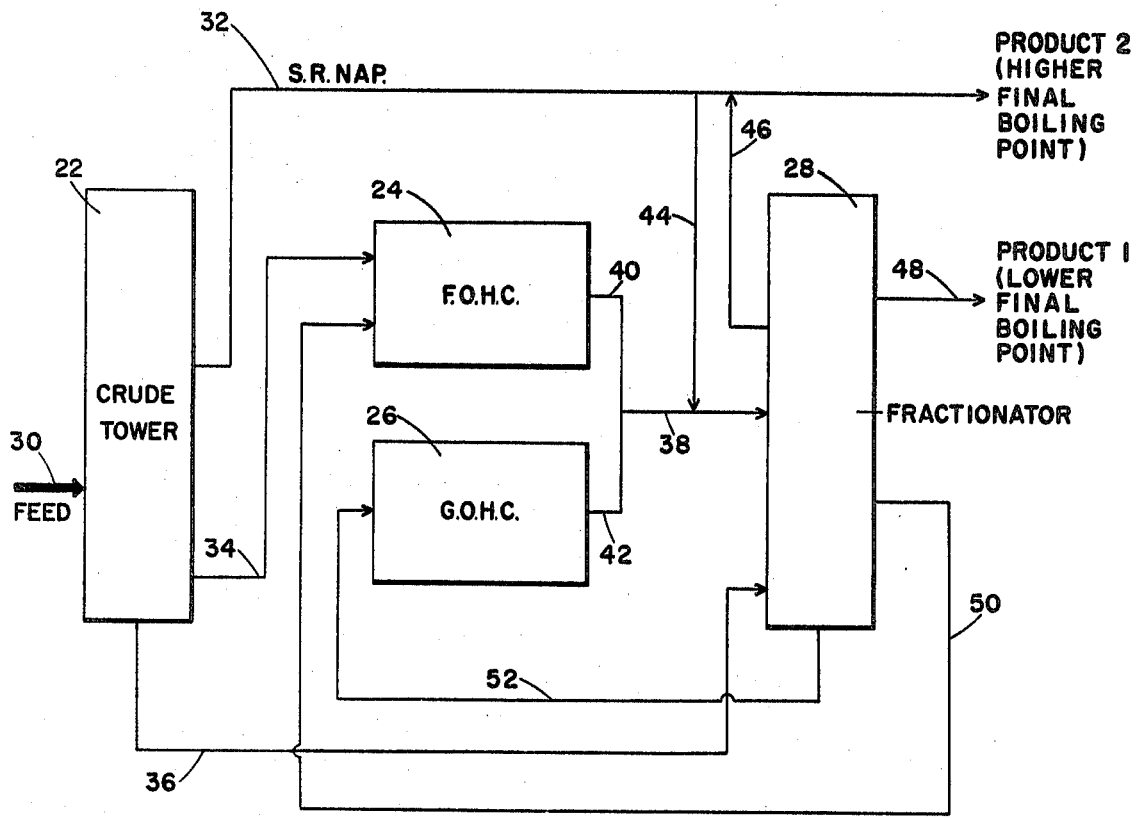
FIG. 2 is a schematic diagram of a refinery process with which the invention has been used.

Referring now to FIG. 2, there is shown a schematic diagram of a hydrocracking process with which the invention has been successfully used. The elements in the process are a crude tower 22, a furnace oil hydrocracker 24 (F.O.H.C.), a gas oil hydrocracker 26 (G.O.H.C.), and a fractionator 28. Within each of the hydrocrackers 24 and 26 there is a vertically arranged series of catalyst beds. To control the temperature within the hydrocrackers, a stream of a cool fluid, referred to as the quench, is injected into each of the reactors. In the preferred arrangement, the product discharged from the hydrocrackers is separated into a hydrogen-rich gas and a liquid stream. Part of the hydrogen-rich gas is cooled and is introduced as the quench into the hydrocracker between the catalyst beds. Quench flow is one of the input variables critical to determining the energetics of the hydrocracking process. Feed stock is put into the system in crude tower 22 through a feed line 30. A relatively high boiling point fraction is taken off of tower 22 and delivered by a line 32 to subsequent processes, such as reformers or the like. Product 2 in line 32 is called straight-run naphtha (S.R. Nap.). A furnace oil fraction is taken off of tower 22 and delivered through a line 34 to F.O.H.C. 24. Gas oil is taken as the bottoms from crude tower 22 and delivered by a line 36 as part of the feed to fractionator 28. Line 38 feeds the combined outputs of F.O.H.C. 24, via a line 40, and G.O.H.C., via a line 42, into fractionator 28.

To increase the volume of produce 1 produced in the overall process, a line 44 delivers a part of the straight-run naphtha from crude tower 22 and line 32 into line 38 through which it flows into fractionator 28. A stream having a final boiling point higher than the final boiling point of product 1 is taken from fractionator 28 above the level of feed line 38 and delivered through line 46 into line 32 where it becomes a part of the higher final boiling point product 2. The amount of straight-run naphtha withdrawn from line 32 for delivery into the fractionator 28 will depend on the relative amounts of product 1 and product 2 desired.

A low boiling point fraction from fractionator 28 is taken off through a line 48 (product 1) and delivered to other processes such as reformers or the like, or to another point of use. A furnace oil fraction is taken off of fractionator 28 and delivered via a line 50 to F.O.H.C. 24. The bottoms of fractionator 28, mostly gas oil, is delivered via a line 52 to G.O.H.C. 26.

Figure 3:
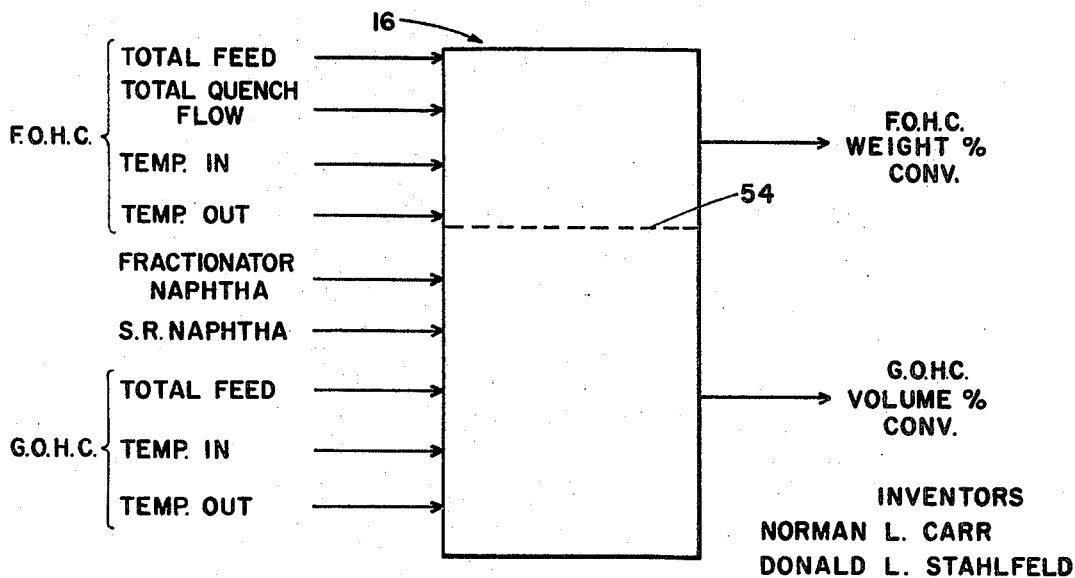
FIG. 3 is a simplified block diagram of the apparatus of the invention.

Referring now to FIG. 3, there is shown a highly simplified diagram of the computer apparatus of the invention which was made according to the method of the invention specifically for use with the process shown in FIG. 2. The two hydrocrackers 24 and 26 are separately treated in computer 16 shown in FIG. 1. For the F.O.H.C., the desired output variable is weight percent conversion per pass, and for the G.O.H.C. the desired output variable is volume percent conversion per pass. The F.O.H.C. system including the computer 16 is based upon kinetic models which involve the fundamental law of mass conservation, while the G.O.H.C. system involves a volumetric balance. This is the way the specific example was built, but either principle could have been applied to either hydrocracker. An imaginary line 54 is drawn across computer 16, and this line will appear again on the detailed schematic of FIG. 4 to show which portions pertain to which computation. For the F.O.H.C., the input variables are total feed in volume units, total quench in volume units, and inlet and outlet temperatures. As will be understood by those skilled in the art, any suitable means or technique, usually already existing in the refinery installation, may be used to obtain these input variables. For example, total quench can be detected in stages across the hydrocrackers and summed up. For the G.O.H.C., the input variables are fractionator naphtha in volume units in line 48, straight-run naphtha in volume units in line 32, total feed in volume units in line 52, and inlet and outlet temperatures.

Referring now to the detailed schematic of the computer apparatus of the invention of FIG. 4, the F.O.H.C. computation will be explained first. For the furnace oil, the desired output variable is weight percent conversion per pass. The following formulas were derived by the above steps of first assembling the source materials, then generating the highly detailed and generalized first model, and utilizing said first model in a manner so as to condense the information therein through the steps of the data tables or performance curves to produce the simplified analog computer monitor. By going through these steps for the F.O.H.C., the following Formula (1) resulted for the F.O.H.C. computation:

$$\text{F.O.H.C. WT. \% CONV. PER PASS} = [K_1 + K_2 T_i - K_3 F] [Q + (K_4 e^{K_L F} - K_5 T_i)(K_6 \Delta T)] \quad (1)$$

In the above formula, $T_i$ is F.O.H.C. inlet temperature, $F$ is feed to the F.O.H.C. in volume units, $e$ is the natural log base, and $\Delta T$ is the inlet and outlet temperature difference. The various constants in the above formula ($K_L$, $K_1$, $K_2$, etc.) are determined as described above dependent upon the physical and chemical characteristics of the particular unit. These conditions also accommodate quench inlet temperature, which is substantially constant in a furnace oil hydrocracker; hence, the quench flow is a measure of the thermal effect of the quench.

Figure 4:
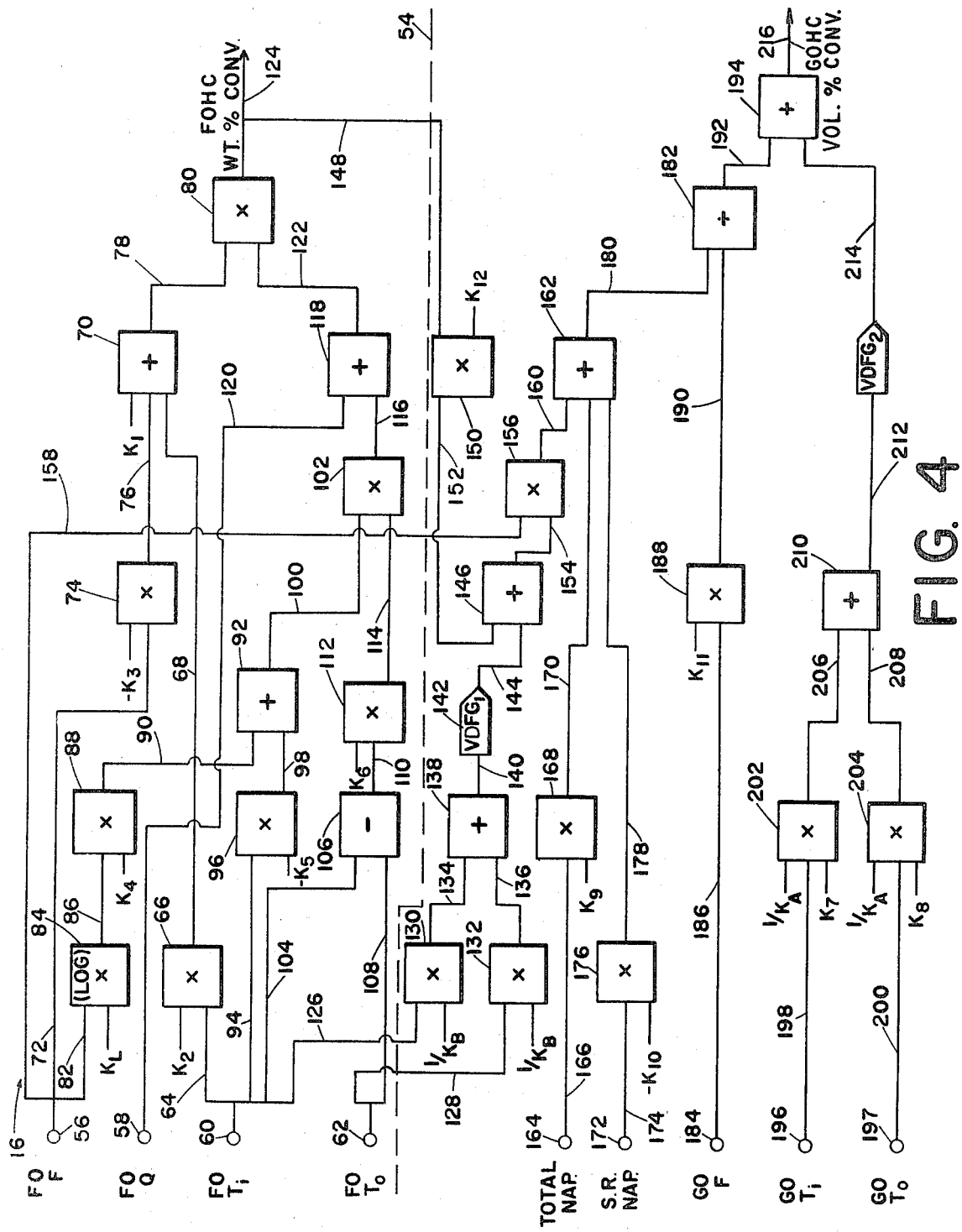
FIG. 4 is a detailed schematic diagram of the apparatus shown in FIG. 3.

Referring now to FIG. 4, and in particular to the portion thereof above imaginary line 54, there is shown a schematic diagram of an analog computer to carry out the above computation to determine the weight percent conversion of the F.O.H.C. The various input variables from the process are detected by conventional means and are fed to computer 16 by way of suitable transducers 56, 58, 60 and 62 which convert the values of these input variables to either current or voltage as required by the computing circuit.

Referring to Equation (1) above, the circuit above line 54 will compute as follows. An electrical signal proportional to inlet temperature ($T_i$) is provided by transducer 60 and fed by a line 64 to a multiplication module or amplifier 66 wherein it is multiplied by $K_2$. The value and sign of $K_2$ and all other constants are provided from a source including a variable element such as a potentiometer, in the usual fashion. The output signal from module 66 which is proportional to the term $K_2 T_i$ is fed through a line 68 to an addition module or amplifier 70. A signal proportional to total feed ($F$) is supplied from transducer 56 through a line 72 to a multiplication module 74 wherein it is multiplied by a signal proportional to $-K_3$. The output signal, $-K_3 F$, is fed through a line 76 to addition module 70. A third signal proportional to $K_1$ is fed into addition module 70. A signal proportional to the sum from addition module 70 is fed through a line 78 to a multiplication module 80. The signal in line 78 is proportional to the first large bracketed quantity of the above F.O.H.C. Equation (1).

Line 82 delivers a signal from transducer 56 proportional to F to a logarithmic multiplication module 84 wherein it is multiplied by a signal proportional to $K_L$. The output signal, proportional to the natural logarithmic base ($e$) raised to the $K_L F$ power is fed by a line 86 to a multiplication module 88 where it is multiplied by a signal proportional to $K_4$, and then delivered by a line 90 to an addition module 92. A signal proportional to $T_i$ is fed from transducer 60 by a line 94 to a multiplication module 96 wherein it is multiplied by a signal proportional to $-K_5$. The output of module 96, proportional to the value of $-K_5 T_i$, is delivered by a line 98 to addition module 92. The output of module 92 is delivered by a line 100 to a multiplication module 102. The signal in line 100 is proportional to the parenthetical $K_4$ and $K_5$ expression in the F.O.H.C. equation. A line 104 supplies a signal proportional to $T_i$ from transducer 60 to subtracting module 106, which is also supplied with a signal from transducer 62 via line 108 proportional to $T_o$ (the outlet temperature of the F.O.H.C.). The output signal of module 106, proportional to $\Delta T$, is fed through line 110 to multiplication module 112 wherein it is multiplied by a signal proportional to $K_6$. The output signal of module 112, proportional to the expression $K_6 \Delta T$, is fed to multiplication module 102 through a line 114. The output of module 102, proportional to the right hand half of the right hand side of F.O.H.C. equation except for the Q, is fed by a line 116 to an addition module 118 wherein it is added to a signal proportional to Q supplied by a line 120 from transducer 58. The output of module 118 is delivered by a line 122 to multiplication module 80, the output of which is the final result, F.O.H.C. weight percent conversion per pass which is delivered by a line 124 to a suitable meter, recorder, or the like.

Referring to the portion of FIG. 4 under imaginary line 54, computer 16 includes means to determine the volume per cent conversion per pass for the G.O.H.C. In its most generalized form, the equation for this computation is as follows:

$$\text{G.O.H.C. C/P} = \text{CONST.}_1 = \text{CONST.}_2 \text{ (nap. yield)} \quad (2)$$

More specifically, and utilizing the methods of the invention described above in a manner similar to that described in conjunction with the derivation of Equation (1), Equation (2) can be expressed as follows:

$$\text{G.O.H.C. VOL. \% C/P} = \left[\frac{(K_7 T_i K_8 T_0)}{K_4}\left(\int VDFG_2\right)\right] + \left[\frac{\text{G.O.H.C.}_{\text{nap.}}}{K_{11} \text{G.O.H.C.}(F)}\right] \quad (3)$$

The right hand side of Equation (3) after the + is equal to a constant times naphtha yield for the G.O.H.C. As is well understood, yield is a term of the art which means volume of product produced per volume of input without regard to amount of recycled material, whereas conversion is a term of the art which is applied where a portion of the material originally fed in is recycled back into the stream of the feed stock flowing into the vessel. Thus, the amount recycled must be included with the amount of the original feed stock in order to determine the overall amount which is converted per pass, or otherwise operated upon by the reaction. Percent conversion per pass therefore is equal to the percentage of total normally liquid feed entering the reactor which is converted to products whose distillation range is below that of the feed. Conversion per pass can be expressed as a weight percent or as a volume percent. In order to determine the volume of naphtha produced by the G.O.H.C., see FIG. 2, it is necessary to perform a naphtha balance around the overall system, since the outputs of the F.O.H.C. and the G.O.H.C. are combined into line 38, and it is not feasible from a practical viewpoint in the particular installation involved, to separately measure the volume of naphtha produced by the G.O.H.C. Thus, it was not possible to distinguish the naphtha produced by the F.O.H.C. from that produced by the G.O.H.C. without the use of the present invention. The equation for this naphtha balance is:

$$\text{G.O.H.C.}_{\text{nap.}} = K_9(\text{TOTAL Nap.}) - K_{10}(\text{S.R. Nap.}) - \text{F.O.H.C.}_{\text{nap.}} \quad (4)$$

The amount of naphtha in line 46 is a known percentage of the heavier naphtha components entering the fractionator 28, and it is taken into account in the values of the constants in equation (4).

Equation (4) requires a quantitative value for the naphtha produced by the F.O.H.C. In its most general form, this equation can be expressed, similarly to Equation (2), as follows:

$$\text{F.O.H.C.}_{\text{nap.}} = \text{CONST.}_1 + \text{CONST.}_2 (\text{C/P}) \quad (5)$$

More specifically, and applying the methods of the invention, equation (5) can be expressed as follows:

$$\text{F.O.H.C.}_{\text{nap.}} = \left[\left(\frac{T_i + T_0}{K_B}\right)\left(\int VDFG_1\right)\right] [K_{12}(\text{F.O.H.C. wt. C/P}) \text{ F.O.H.C.}(F)] \quad (6)$$

The lower part of the circuitry, below line 54 in FIG. 4, carries out the computation of Equations (6), (4) and (3) to arrive at G.O.H.C. volume percent conversion per pass. Starting with Equation (6), a pair of lines 126 and 128 feed signals from transducers 60 and 62, respectively, to a pair of multiplication modules 130 and 132, respectively, wherein each of the signals is multiplied by appropriate constants, $1/K_B$. These values are fed through a pair of lines 134 and 136 to an addition module 138 in order to get the effective average reactor temperature across the F.O.H.C. This signal is fed through a line 140 to a first variable diode function generator (VDFG$_1$) 142. A VDFG comprises an array of electronic components for representing as simple, discrete input-output signals, a complex, non-linear mathematical relationship between two variables.

Referring to FIG. 5, it will be seen that VDFG$_1$ 142 will put out a quantitative value for naphtha yield for the F.O.H.C. at any particular effective average reactor temperature in the range covered. The information stored in VDFG$_1$ 142 is obtained according to the method of the invention from the sources described above. The output signal from VDFG$_1$ 142 passes through line 144 to addition module 146.

The final output signal of the F.O.H.C. weight percent conversion per pass computation described above, which is performed by the components above imaginary line 54, is tapped out of line 124 by a line 148 and fed to a multiplication module 150 in which it is multiplied by a signal proportional to the value of a constant $K_{12}$. The output signal of module 150 is fed through a line 152 to additional module 146. The output of addition module 146 is fed through a line 154 to a multiplication module 156. The signal in line 154 is proportional to the percent yield of the F.O.H.C. By multiplying the signal in line 154 by the total weight of material fed into the F.O.H.C., a signal proportional to the actual value of F.O.H.C. naphtha is obtained. To this end, a line 158 supplies a signal from transducer 56 proportional to total feed to the F.O.H.C. to multiplication module 156.

The above description completes the computation of Equation (6). Referring now to Equation (4), a signal proportional to the quantitative value of the F.O.H.C. naphtha is fed through line 160 to an addition module 162 which carries out the computation necessary to evaluate Equation (4). A transducer 164 supplies a signal proportional to total naphtha in line 48 (FIG. 2) through a line 166 to a multiplication module 168 wherein it is multiplied by a signal proportional to the value of a constant $K_9$. The output of module 168 is fed through a line 170 to addition module 162. A transducer 172 supplies a signal proportional to the amount of straight-run naphtha in line 44 (FIG. 2) through a line 174 to a multiplication module 176 wherein it is multiplied by a signal proportional to the value of a constant $K_{10}$. The output of module 176 is fed by a line 178 to addition module 162. The output signal of module 162 in a line 180 is proportional to the quantitative value of the naphtha produced by the G.O.H.C., thus completing the computation of Equation (4).

Referring now to Equation (3), which is the final equation in the chain necessary to arrive at the value of volumetric conversion per pass for the G.O.H.C., the signal in line 180 is fed to a division module 182. A transducer 184 supplies a signal proportional to the quantitative value of the feed to the G.O.H.C., which signal is fed through a line 186 to a multiplication module 188 wherein it is multiplied by a constant $K_{11}$. The output of module 188 is sent through a line 190 to division module 182.

The output signal of module 182, which is proportional to naphtha yield for the G.O.H.C., is supplied by a line 192 to an addition module 194.

In a manner similar to the computations performed by modules 130, 132, and 138 described above, a pair of transducers 196 and 197 supply signals proportional to the inlet and outlet temperatures of the G.O.H.C. through a pair of lines 198 and 200 to a pair of multiplication modules 202 and 204, in which they are multiplied by constants $1/K_A$, $K_7$, and $K_8$, respectively, and then supplied through a pair of lines 206 and 208 to an addition module 210, which puts out a signal in a line 212 proportional to the value of the effective average reactor temperature in the G.O.H.C. Referring to FIG. 6, the signal proportional to the effective average reactor temperature in the G.O.H.C. in line 212 is fed to a VDFG$_2$ for the gas oil hydrocracker, which puts out, in response thereto, a signal proportional to naphtha yield for the G.O.H.C. in output line 214.

Equations (2) and (3) which determine conversion per pass for the G.O.H.C., are graphically represented in the curves of FIG. 7. These curves relate naphtha yield and a family of effective average reactor temperatures to G.O.H.C. conversion per pass. The first expression in Equations (2) and (3) selects the particular temperature curve which will be used, and the second expression in said equations determines the point on that particular curve, along a $y$ axis, which curve point determines a quantitative value of conversion per pass on the $x$ axis. The family of curves of FIG. 7 are determined by the method of the invention as described above. Thus, one of the constants is associated with the effective average reactor temperature, and the other constant is associated with the level of conversion concerned. A similar relationship exists for Equation (5), as is obvious, except that the temperature lines are, mathematically, reciprocals of the temperature lines in FIG. 7.

The signal in line 214 is fed to the addition module 194, the output of which is present in a line 216, and is proportional to volume percent conversion per pass for the G.O.H.C. This signal is fed to any suitable recorder, meter, or the like.

Figure 8:
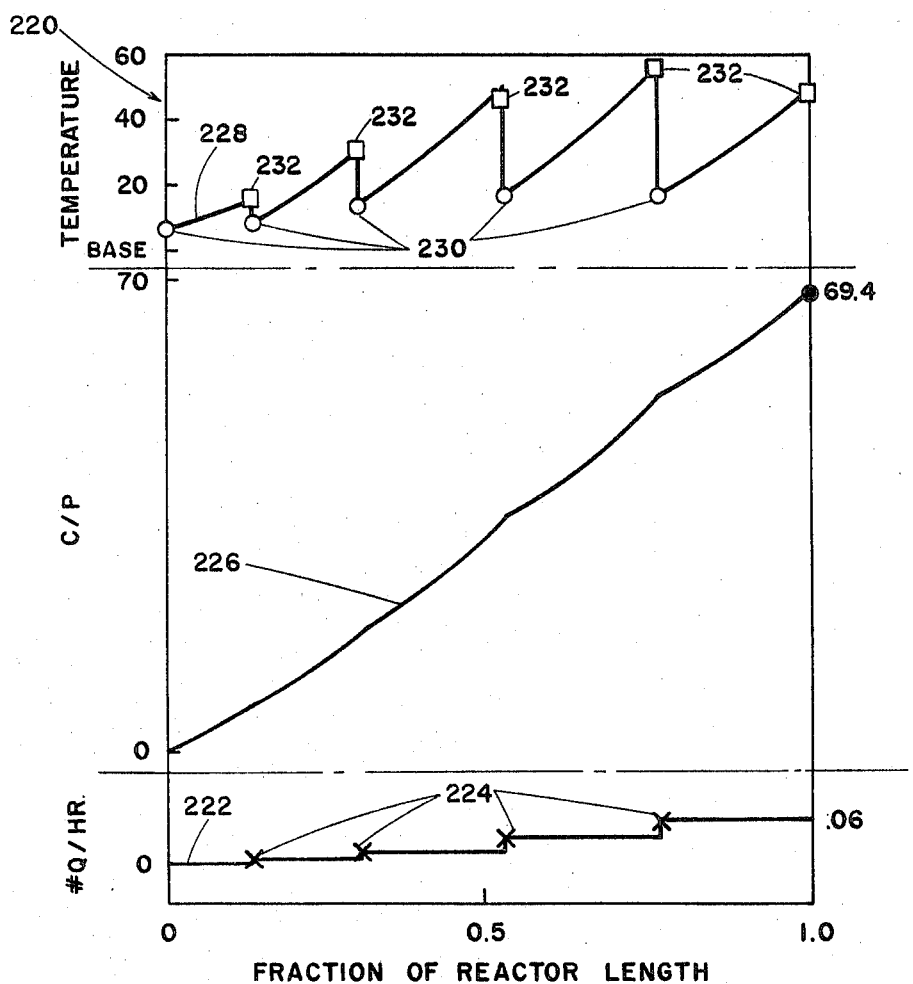
FIGS. 8 and 9 are curves showing predicted hydrocracker responses of various variables and measured values of certain of said variables.

Referring now to FIG. 8, there is shown a family of curves 220 that show predicted responses for various variables within a hydrocracker containing five catalyst beds and having quench injected between the beds. Generalized model 12 was slightly modified to simulate a different particular existing F.O.H.C., and said F.O.H.C. was later run under the same operating conditions in order to establish the validity of model 12.

In order to establish the validity of model 12, the commercial F.O.H.C. was run and data were collected during the run. Later, the actual data for inlet bed temperatures and feed stock feed only were fed into an appropriately modified model 12 and by running said model 12 all of the other data shown in FIGS. 8 and 9 were generated and certain of them compared to the measured data.

Figure 9:
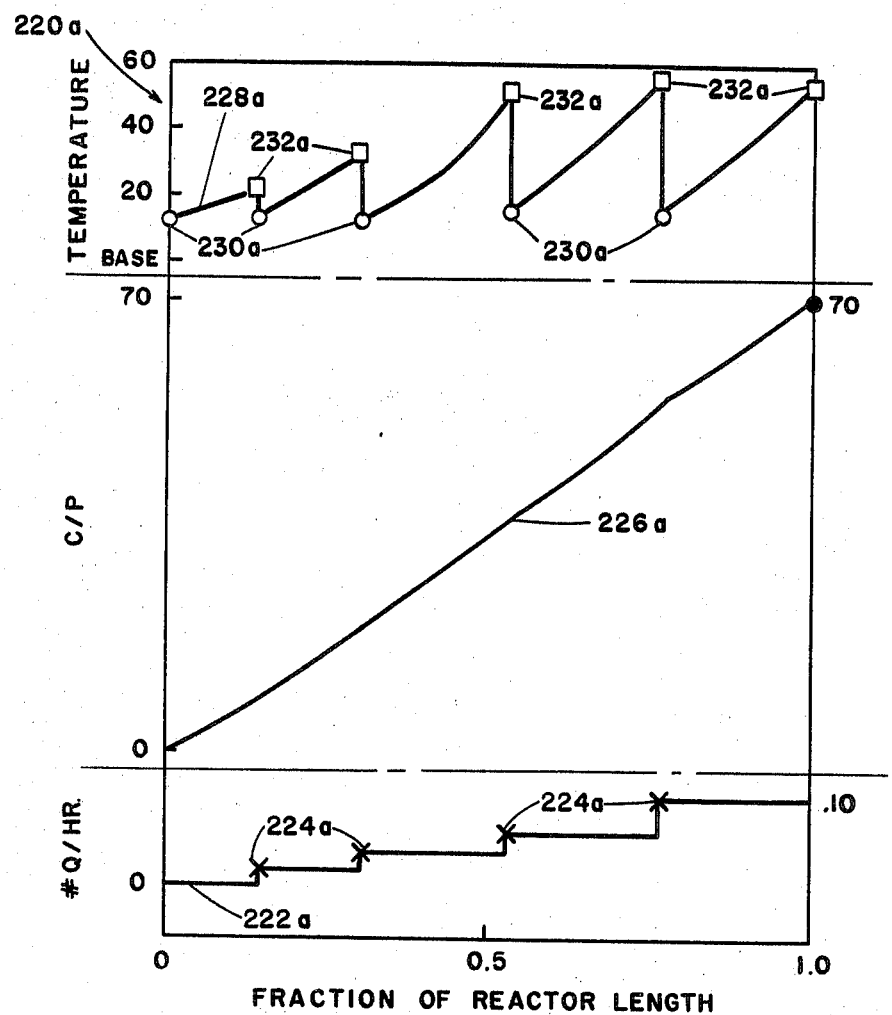

The two curves of FIGS. 8 and 9 differ in that in the family of curves of FIG. 8 the two compressors that provide the gas which is used for recycle and for quench were both used, and only one of these compressors was used in the case of FIG. 9. Only half compressor capacity was used in the case of FIG. 9 to illustrate reactor conditions if one of the compressors should be taken off line for repair, or to simulate a breakdown or the like. Thus, proving of model validity was accomplished at both normal operating conditions, and at the abnormal condition wherein only half compressor capacity is available.

Referring now to FIG. 8 in detail, the three curves are all plotted against reactor length on the $x$ axis, and each against its own operating variable on the $y$ axis. The lowermost curve 222 on FIG. 8 represents quench flow in pounds per hour plotted against reactor length as a fraction of the entire reactor length. The step-like curve 222 shows the quench rates predicted as being required by the hydrocracker in order to maintain the desired conversion per pass. The points 224 marked with "x's" represent measured quench rates, it being understood that the vertical distances between any two $x$'s represent the amount of quench added at that particular point. It is noteworthy that the predicted curve passes substantially exactly through all of the measured points.

Curve 226 next above curve 222 charts conversion per pass (C/P). For the particular run used for FIG. 8, the final conversion happened to be 69.4 percent. This value was determined by laboratory analysis of samples collected during the test run of the commercial F.O.H.C. The model 12 predicted a conversion of 69.4 percent. The remainder of curve 226 shows intrareactor conversion data. These data are difficult to collect in a commercial installation, and therefore are not ordinarily measured, but are easily produced by model 12, and are of both general interest and of particular interest as an intermediary step in the generation of both models 12 and 16.

Uppermost curve 228 charts inlet and outlet bed temperatures within the reactor. The inlet temperature points for each catalyst bed, indicated by circles 230, were preset and were one of the two inputs to model 12. The outlet bed temperatures indicated by squares 232 are the points which were measured. The curve 228 was predicted by model 12, and, of course, passes through preset points 230, but, significantly, also passes very accurately through the observed outlet temperatures 232.

The curves in FIG. 9 are quite similar to those of FIG. 8 with the exception that the test run on which the FIG. 9 curves are based was run with only half compressor capacity, as explained above. All curves were plotted against the same response variables and against fraction of reactor length as in the case of FIG. 8, and therefore, similar curves and points in FIG. 9 are indicated by the same reference numerals used in FIG. 8 followed by "a." It is noteworthy that predicted conversion, which in the case of the test run on which FIG. 9 was based was 70 percent, corresponded to the predicted conversion, also 70 percent, despite the extraordinary reactor condition of half compressor capacity.

Thus, the ability of highly detailed and generalized model 12 to predict significant variable responses of a highly complex chemical process is verified by the close correspondence of the measured data to the predicted data, under varying conditions, as shown by the families of curves of FIGS. 8 and 9. Further, model 12 yields other data, such as intra-reactor conversion levels, and other data not shown, which are otherwise unavailable or at least extremely difficult and expensive to obtain.

The validity of model 16 was proved after the analog computer embodying this model was put in use monitoring the commercial unit for which it was built. This was accomplished by making periodic analysis of the products produced to determine conversion per pass, and then comparing these conventionally determined conversion figures to the values determined by computer 16. Of course, appropriate corrections were made to eliminate the time lag between the present values of conversion determined by computer 16 and the "after the fact" values that are necessarily determined by analytical methods. In all cases, the conversion values determined by computer 16 corresponded substantially exactly with the values determined by analytical methods.

While the invention has been described in detail above, it is to be understood that this detailed description is by way of example only, and the protection granted is to be limited only within the spirit of the invention and the scope of the following claims.

We claim:

1. A method of monitoring a chemical process that is housed in a vessel and is characterized by a substantial exchange of heat and no substantial unaccountable heat loss from the vessel, comprising the steps of assembling theoretical source material information about the process, generating a first detailed mathematical model of said process from said assembled information which will behave substantially identically to the behavior of the process to be monitored in substantially all respects, selecting at least one output response variable of the process to be monitored, selecting a plurality of critical input variables of the process to be monitored, selecting those ranges of values that it can be expected said input variables would vary through in actual use of the process, introducing values in said selected ranges of values of said input variables into said detailed model, generating tables of the changing values of said selected input and output variables as determined by said detailed model, generating a second mathematical model of the process to be monitored from said tables of responses of said selected input and output variables only building a monitoring device embodying said second mathematical model,, feeding values of said selected input variables from the process to be monitored into said monitoring device and embodying said second mathematical model, and monitoring said at least one selected output variable.

2. The method of claim 1, said selected critical input variables comprising those variables which are normally monitored during operation of the process.

3. The method of claim 1, wherein said process to be monitored is a furnace oil hydrocracker, said selected input variables comprising total feed rate, total quench flow, and inlet and outlet temperatures, and said selected response variable comprising conversion per pass.

4. The method of claim 1, said step of generating said data tables being performed with the use of a general purpose analog computer and by converting the output of said analog computer into tables of data.

5. The method of claim 1, said step of generating said data tables being performed by a general purpose digital computer.

6. The method of claim 1, said monitoring device comprising a special purpose analog computer.

7. The method of claim 3, wherein said monitoring device comprises a special purpose analog computer wherein conversion per pass is computed according to a formula having the form:

F.O.H.C WT. % CONV. PER PASS = $[K_1+K_2T_i - K_3F]$ $[Q +(K_4e^{K_LF} - K_5T_i)(K_6\Delta T)]$ wherein the constants $K_1$ through $K_6$, and $K_L$ are determined by the physical and chemical characteristics of the process to be monitored, wherein $T_i$ is inlet temperature, $F$ is total feed, $e$ is the natural log base, and $\Delta T$ is the inlet and outlet temperature difference.

8. A method of automatically and continuously monitoring an output response variable of a chemical reaction process that is housed in a vessel and is characterized by a substantial exchange of heat and no substantial unaccountable heat loss from the vessel, comprising the steps of continuously measuring the values of a plurality of critical physical input variables of said process, continuously generating a first signal representative of a combined value of a first combination of values of said critical input variables in said plurality of critical input variables, continuously generating a second signal representative of a combined value of a second combination of values of said critical input variables in said plurality of critical input variables, continuously generating a third signal indicative of said output response variable from said first and second signals, and continuously displaying said third signal, wherein said chemical process is a furnace oil hydrocracker and said output response variable is conversion per pass.

9. The method of claim 8, wherein said plurality of critical input variables consists of total feed, quench flow, and inlet and outlet temperatures, said first combination of critical input variables consisting of said total feed and said inlet temperature, and said second combination of said critical input variables consisting of said quench, said inlet temperature, said total feed, and the difference between said inlet and outlet temperatures.

10. The method of claim 9, wherein said hydrocracker is a first hydrocracker in a process comprising said first and a second hydrocracker, continuously measuring the values of total feed, and inlet and outlet temperatures for said second hydrocracker, continuously measuring those flows of a material within said process sufficient to permit the calculation of a balance of said material around the process, continuously generating a fourth signal representative of a combined value of said measured values of said inlet and outlet temperatures of said second hydrocracker, continuously calculating said balance around said process utilizing said measured values of said flows of said material and said third signal, continuously generating a fifth signal from said continuous calculation of said balance indicative of the amount of the product produced by said second hydrocracker, continuously generating a sixth signal indicative of conversion per pass for said second hydrocracker from said fourth and fifth signals, and continuously displaying said sixth signal.

11. The method of claim 10, wherein said material is naphtha.

12. Apparatus for monitoring a continuous chemical reaction process that is housed in a vessel, produces a temperature gradient therein, and includes means to prevent any unaccountable substantial heat loss from the vessel; comprising a special purpose analog computer, means to feed signals to said computer proportional to the values of selected critical physical input variables of said chemical process, said computer comprising means to determine present values of a selected output response variable of said process from said signals, and means to read out said values of said selected output response variable as determined by said computer, wherein said chemical reaction process is a hydrocracking process and said selected output response variable comprises conversion per pass.

13. The apparatus of claim 12, wherein said selected input variables comprise total feed, inlet and outlet temperatures, and volume of quench flow.

14. The apparatus of claim 12, wherein, said selected input variables comprising total feed, inlet and outlet temperatures, and volume of quench flow, said computer comprising means to determine conversion per pass according to a relationship having the form:

Conversion per pass $= [K_1 + K_2 T_i - K_3 F] [Q + (K_4 e^{K_L F} - K_5 T_i)(K_6 \Delta T)]$ wherein the constants $K_1$ through $K_6$, and $K_L$ are determined by the physical and chemical characteristics of the process to be monitored, wherein $T_i$ is inlet temperature, $F$ is total feed, $e$ is the natural log base, and $\Delta T$ is the inlet and outlet temperature difference.

15. Apparatus for monitoring present values of selected output variables of a process which comprises first and second reactors, means to feed feedstock to each of said first and second reactors, said first and second reactors producing different products, said different products being combined into a single stream, a computer, means to feed the values of selected critical input variables from said first and second reactors to said computer, said computer comprising means to determine the present value of said selected output variables of each of said first and second reactors from said signals, and means to display the present values determined by said computer.

16. The apparatus of claim 15, said computer comprising means to determine the present value of said selected output variable for said second reactor by utilization of the values of said selected output variable for said first reactor as determined by said computer and the overall flows of material through said process.

17. The apparatus of claim 15, said first and second reactors comprising hydrocrackers, said selected critical input variables including total feed and inlet and outlet temperatures for each of said first and second reactors, and said selected output variables comprising conversion per pass for each of said first and second reactors.

18. The apparatus of claim 17, said process further comprising first and second distillation towers, means to feed all materials processed by said process into said first distillation tower first, means to take off a first fraction from said first distillation tower and means to feed said first fraction to subsequent processes, means to take off a second fraction from said first distillation tower and to feed said second fraction to said first reactor, means to take off a third fraction from said first distillation tower and to feed said third fraction to said second distillation tower, means to take off a first fraction from said second distillation tower and to feed said first fraction from said second distillation tower to subsequent processes, means to take off a second fraction from said second distillation tower and to feed said second fraction from said second distillation tower to said first reactor, means to take off a third fraction from said second distillation tower and to feed said third fraction from said second distillation tower to said second reactor, means to feed said combined single stream of said different products from said first and second reactors to said second distillation tower; whereby said feed stock to said first reactor consists of said second fraction from said first distillation tower and said second fraction from said second distillation tower, and said feedstock to said second reactor consists of said third fraction from said second distillation tower; said computer comprising means to determine the present value of conversion per pass for said first reactor by utilization of said values of said selected critical input variables of said first reactor, and said computer comprising means to determine conversion per pass for said second reactor by performing a material balance around said process and by utilizing the value of conversion per pass for said first reactor as determined by said computer.

19. The apparatus of claim 18, the selected critical input variables for said second reactor to perform said material balance comprising the flow of material in said take-off means for said first fraction from said second distillation tower less the flow of material in said take-off means for said first fraction from said first distillation tower, and less the flow of product produced by said first reactor which is determined from the computer determination of conversion per pass for said first reactor.

20. The apparatus of claim 19, said computer comprising means to determine the quantity of material produced by said first reactor according to a relationship having the form:

Quantity of Material Produced by First Reactor $=$ CONSTANT$_1$ $+$ CONSTANT$_2$ (Conversion per pass in first reactor)

wherein CONSTANT$_1$ is a number associated with the effective average reactor temperature, and CONSTANT$_2$ is a coefficient associated with the particular conversion level at which the reactor is operating.

* * * * *